United States Patent
Inoue et al.

[11] Patent Number: 6,133,705
[45] Date of Patent: Oct. 17, 2000

[54] MOTION CONTROLLER

[75] Inventors: Hideaki Inoue, Tsuru; Kentaro Fujibayashi, Musashino; Yusaku Yamada, Minamitsuru-gun, all of Japan

[73] Assignee: Fanuc Ltd., Yamanishi, Japan

[21] Appl. No.: 09/168,436

[22] Filed: Oct. 7, 1998

[30] Foreign Application Priority Data

Oct. 7, 1997 [JP] Japan ................................ 9-289276

[51] Int. Cl.⁷ .................................................... H02P 7/00
[52] U.S. Cl. ............................ 318/632; 318/567; 318/600
[58] Field of Search ................................. 318/632, 601, 318/567, 696, 701, 254, 600; 364/474.01, 474.02, 474.03, 474.28

[56] References Cited

U.S. PATENT DOCUMENTS 5,600,221  2/1997  Tomatsuri et al. ............. 318/632
5,859,515  1/1999  Takizawa et al. ............... 318/560

*Primary Examiner*—Robert E. Nappi
*Assistant Examiner*—Rita Leykin
*Attorney, Agent, or Firm*—Staas & Halsey

[57] ABSTRACT

A numeric array of move command data Qi constituting a reference cam diagram F (θ) is stored in advance in a data table of a CMOS memory. Alternatively, a shift position of a cam corresponding to a rotational angle θ of the cam is stored in advance so that move command data can be generated by obtaining the shift position of the cam from the rotational angle of the cam based on the rotational angle value. In response to the input of a shift Ka in the lift direction, shift Kb in the pitch-circle direction, maximum lift Kc, and data number n as a criterion for extension or compression in the pitch-circle direction, the move command data can be corrected by automatic processing by means of a motion controller. Thus, final move command data Pk can be generated and outputted as position commands.

9 Claims, 9 Drawing Sheets

FIG. 8 m=10, n=12

| i, k | 0 | 1 | 2 | 3 | 4 | 5 | 6 | 7 | 8 | 9 | 10 | 11 |
|---|---|---|---|---|---|---|---|---|---|---|---|---|
| Qi | 5 | 3 | 0 | -3 | -5 | -5 | -3 | 0 | 3 | 5 | | |
| Pk | 4 | 3 | 1 | -1 | -3 | -4 | -5 | -2 | -1 | 1 | 3 | 4 |

FIG. 9 m=10, n=8

| i, k | 0 | 1 | 2 | 3 | 4 | 5 | 6 | 7 | 8 | 9 |
|---|---|---|---|---|---|---|---|---|---|---|
| Qi | 5 | 3 | 0 | -3 | -5 | -5 | -3 | 0 | 3 | 5 |
| Pk | 5 | 3 | -2 | -6 | -5 | -3 | 2 | 6 | | |

MOTION CONTROLLER

BACKGROUND OF THE INVENTION

1. Field of the Invention

The present invention relates to an improvement of a motion controller, and more particularly, to an improvement of a motion controller that functions as an electronic cam.

2. Description of the Related Art

Conventionally known is a motion controller using an electronic cam, which stores data (binary data) for move commands to be outputted on a time-series basis in advance, and outputs the values of the move commands by turns with every predetermined cycle to drivingly control a servomotor. This motion controller is utilized for high-speed acceleration/deceleration operation of an automatic machine or machine tool.

In the conventional motion controller, the servomotor is only drivingly controlled on a time-series basis along a data array of move commands stored in storage means. If hardware or application is modified or in changing the operation of the electronic cam itself, an operator or programmer must inevitably regenerate a numeric array of move command data corresponding to the operation and reenter it into the storage means. Thus, changing or modifying the hardware, application, or operation requires a very troublesome data updating operation.

SUMMARY OF THE INVENTION

The object of the present invention is to provide a motion controller capable of easily coping with change or modification of hardware, application, or operation of an electronic cam, without requiring an operator's or programmer's troublesome data updating operation.

The above object is achieved by a motion controller which comprises storage means for storing a numeric array of move command data constituting a reference cam diagram on a time-series basis, and automatic correcting means for correcting the move command data stored in the storage means, for example, in accordance with change of hardware or application or change of cam operation, to generate new move command data.

Automatic correction is carried out by adding to or subtracting a constant from each of numeric values of the reference move command data, whereby the cam diagram formed according to the reference move command data is shifted in the lift direction.

Automatic correction is carried out by shifting each of numeric values of the reference move command data along the time axis, whereby the cam diagram formed according to the reference move command data is shifted in the pitch-circle direction (or the direction of the phase or time).

Automatic correction is carried out by multiplying each of numeric values of the reference move command data by a constant, whereby the lift of the cam diagram formed according to the reference move command data is changed.

Automatic correction is carried out such that the time base of the reference move command data is extended or compressed, and move command data corresponding to an actual move command output cycle is extracted from the numeric array of the move command data where the time axis is extended or compressed, whereby the numeric array of move command data is regenerated. By doing this, the cam diagram formed according to the reference move command data is extended or compressed in the pitch-circle direction.

According to the motion controller of the present invention, an operator or programmer can easily correct the operation of an electronic cam, coping with change or modification of hardware, application or operation of the cam itself, by only inputting a constant associated with the shift, extension or compression of the cam without carrying out a troublesome updating operation for the move command data.

Change of the lift of the cam diagram and shifts in the lift and pitch-circle directions can be corrected with every processing cycle of the motion controller in accordance with the move command data that constitute the reference cam diagram, so that the correction can be started during the operation of the electronic cam.

BRIEF DESCRIPTION OF THE DRAWINGS

The foregoing and other objects and feature of the invention will become apparent from the following description of preferred embodiments of the invention with reference to the accompanying drawings, in which:

FIG. 8 is a table showing an example of the result of processing for the case where the reference cam is extended in the pitch-circle direction;

FIG. 9 is a table showing an example of the result of processing for the case where the reference cam is compressed in the pitch-circle direction.

DETAILED DESCRIPTION OF THE PREFERRED EMBODIMENTS

Figure 1:
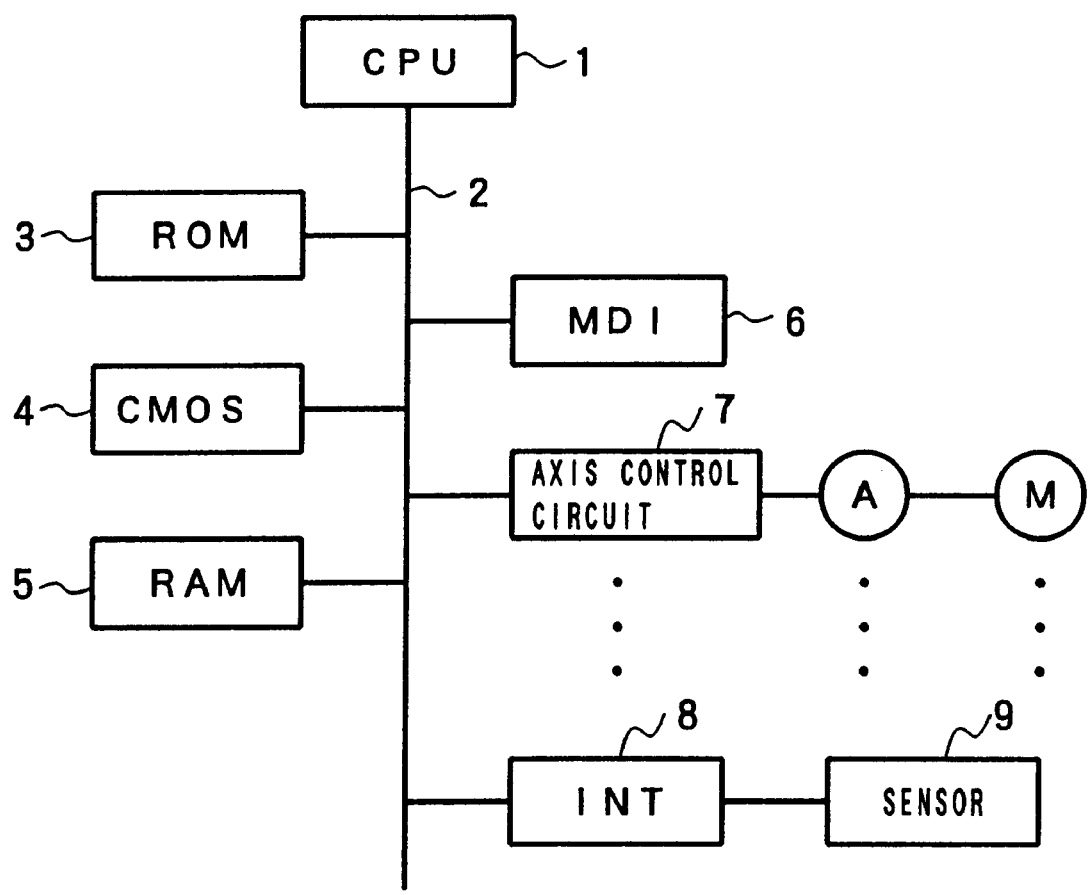
FIG. 1 is a block diagram showing a motion controller according to one embodiment of the present invention and the principal part of an automatic machine drivingly controlled by means of the motion controller.

Preferred embodiments of the present invention will now be described with reference to the accompanying drawings. FIG. 1 is a block diagram showing a motion controller according to one embodiment of the invention and the principal part of an automatic machine or the like that is drivingly controlled by means of the motion controller.

A processor 1 is a processor that generally controls the motion controller. It reads out a system program from a ROM 3 through a bus 2 and generally controls the motion controller in accordance with the system program. A RAM 5 is loaded with temporary computation data and the like. A CMOS memory 4, which is backed up by means of a battery (not shown), is constructed as a nonvolatile memory whose storage contents can be maintained even when the motion controller is disconnected from the power supply.

An interface 8 is an interface for external apparatuses. In the example shown in FIG. 1, it is connected with a sensor 9 for detecting the positions of articles as objects of operation of the automatic machine or the like. The operation of an electronic cam is started in response to a signal from the sensor 9.

An MDI 6 is a manual data input device that constitutes a man-machine interface between the motion controller and an operator or programmer.

An axis control circuit 7 receives a move command from the processor 1 and delivers it to a servo amplifier A. In response to this command, the servo amplifier A drives a servomotor M. In the automatic machine or the like that carries out various axis operations combined, there are a plurality of sets of axis control circuits 7, servo amplifiers A, and servomotors M. In this specification, however, only those members for one axis are described, and a description of members for other axes is omitted.

The servomotor M has a pulse coder (not shown) for position and speed detection built-in. A feedback signal from this pulse coder is fed back to the axis control circuit 7. Based on this feedback signal and the aforesaid move command, a servo control CPU stored in the circuit 7 carries out processing for a position loop, speed loop, and current loop, obtains a torque command for final drive control, and controls the position and speed of the servomotor M.

If the servomotor M is expected to perform high-speed cam operation or some other operation that involves successive short move commands, moreover, shift position data for the rotational angle (phase) is previously stored as cam diagram data in the CMOS memory 4, and incremental move command data to be outputted with every distribution cycle is obtained from the cam diagram data and outputted, instead of carrying out a regular move command distribution process (pulse distribution process) that requires preprocessing.

Figure 2A:
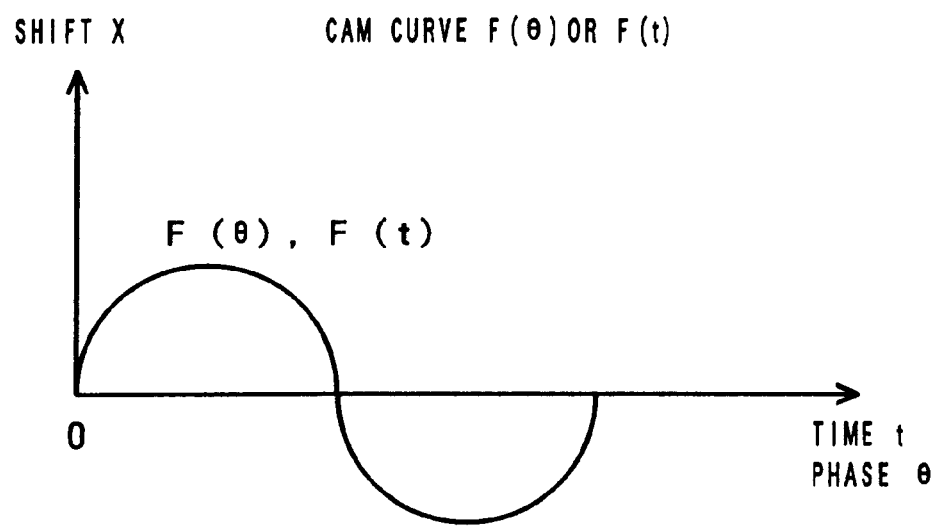
FIGS. 2A and 2B are a cam diagram and a data diagram, respectively, showing an example of reference cam operation.

FIG. 2A shows an example of a numeric array for position data that constitutes a reference cam diagram. In FIG. 2A, the axis of abscissa represents time t or rotational angle (phase) $\theta$, while the axis of ordinate represents a position value equivalent to a lift for each rotational angle.

For each cycle of a cam curve $F(t)$, it is supposed that it takes time Tr. If a move command is outputted with every move command distribution cycle T for the cam curve $F(t)$, values $Q0, Q1, Q2, \ldots, Qi, \ldots, Qm$ for the incremental move command data to be outputted with every distribution cycle are computed as follows:

$Q0 = F(T \times 1) - F(0)$, $Qi = F(T \times (i+1)) - F(T \times i)$, $Qm = F(0) - F(T \times m)$, where $m+1 = Tr/T$.

Figure 2B:
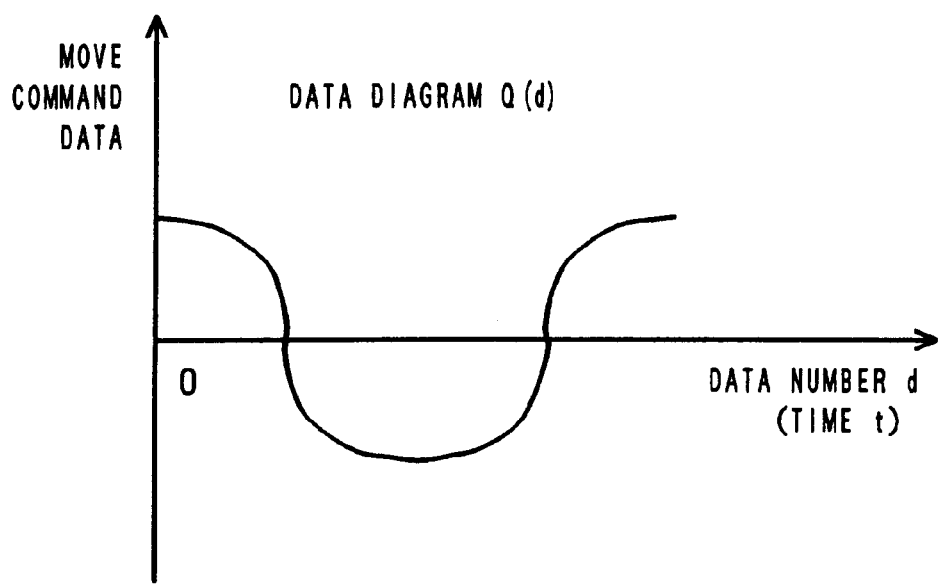

FIG. 2B shows the result of this computation. In FIG. 2B, the axis of ordinate represents a move command data value $Q(d)$ for each distribution cycle, while the axis of abscissa represents a data number (distribution cycle number) d.

Q0 is the value of move command data corresponding to $\theta=0°$ and elapsed time $t=0$, while Qm is the value of move command data corresponding to $\theta=360°$ and elapsed time $t=m \cdot T$.

The value of an index i for specifying the address of the cam diagram data is incremented by one with every output cycle T. Based on this value of the index i from cam curve data $F(t)$ and $F(\theta)$, the aforesaid computation is made for each output cycle to obtain the respective values of the incremental move command data Q0 to Qm. Cam operation based on the servomotor M can be achieved by delivering these values as move commands to the axis control circuit 7. Alternatively, the values of the incremental move command data Q0 to Qm may be obtained and stored in advance in the form of a data table for the move command data in the CMOS memory 4 so that the data Q0 to Qm can be successively read and outputted with every move command distribution cycle. In the description to follow, it is supposed that the data table stored with the incremental move command data Q0 to Qm is prepared in advance. According to the present embodiment, control is based on the move command data Q0 to Qm for each move command distribution cycle T, so that the cam curve will hereinafter be represented as the function of time, $f(t)$;

The simplest example of application to the cam is for an automatic machine in which a pinion is mounted on the rotor shaft of the servomotor M and a racked rod is caused to act direct by means of the pinion. This automatic machine can be used as an automatic loader if it is designed so that articles delivered thereto by means of a conveyor or the like can be forced into a magazine or the like by means of the distal end of the rod. If a stamp is attached to the rod, the machine can be used as an automatic stamper. If a nozzle for liquid injection is attached to the rod end, moreover, the machine can be used as an automatic machine for injecting a refreshing beverage into bottles.

Figure 3A:
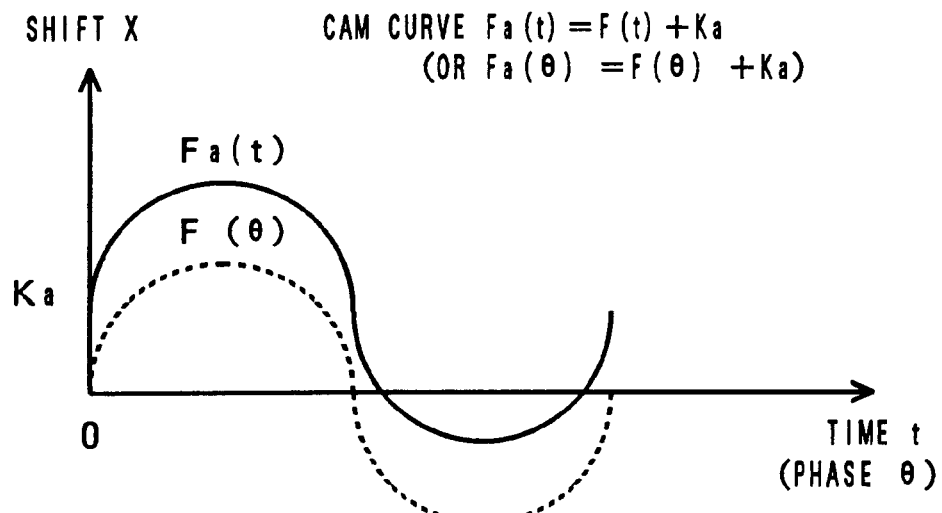
FIGS. 3A and 3B are a cam diagram and a data diagram, respectively, showing an example of operation with a reference cam shifted in the lift direction.
Figure 3B:
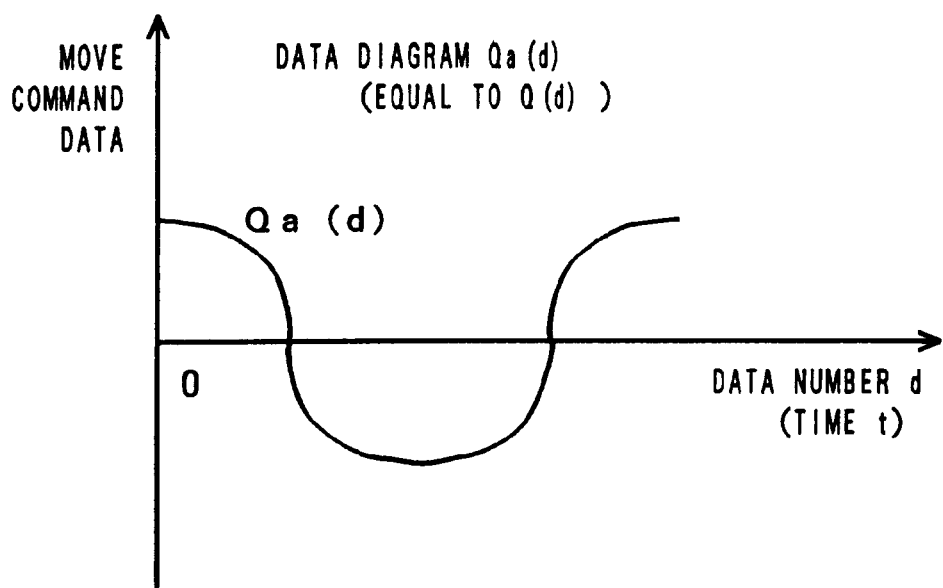

In shifting the center position of the cam (or the center position of the cam stroke), the reference cam diagram $F(t)$ is shifted in the lift direction of the cam to provide a cam diagram $Fa(t)$, as shown in FIG. 3A. In this case, as shown in FIG. 3B, a data diagram $Qa(d)$ for the incremental move command is identical with the data diagram $Q(d)$ shown in FIG. 2B. In this case, a move command value Ka corresponding to the shift is previously set and stored in the CMOS memory 4, and processing for $Q0 \leftarrow Q0+Ka$ is carried out when the value of the move command data Q0 is first read from the data table. The new value of the data Q0 obtained in this process is delivered as a move command to the axis control circuit 7. Thereafter, it is necessary only that the move command data read from the data table be outputted. The cam diagram can be shifted in the reverse direction if Ka is set at a negative value.

The cam diagram $F(t)$ must be shifted in the lift direction of the cam in the case where the length of a mechanism to be connected to the cam, that is, the length of the racked rod for the aforesaid example, is changed (example of change of hardware).

Figure 4A:
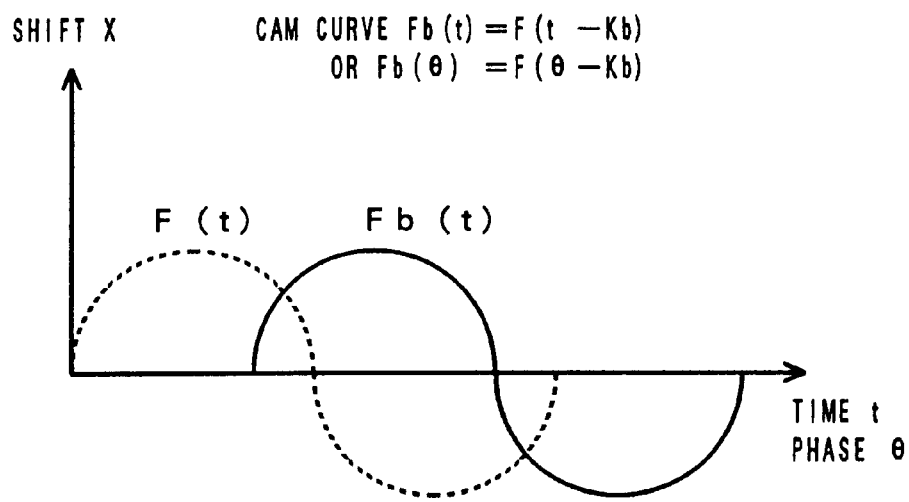
FIGS. 4A and 4B are a cam diagram and a data diagram, respectively, showing an example of operation with the reference cam shifted in the pitch-circle direction.

If the reference cam diagram $F(t)$ is shifted in the pitch-circle direction of the cam (or the direction of the phase $\theta$ or time t in FIG. 4A) to provide $Fb(t)$, as shown in FIG. 4A, it is necessary only that the initial value of the index i for reading Qi be corrected by a margin for the shift.

Figure 4B:
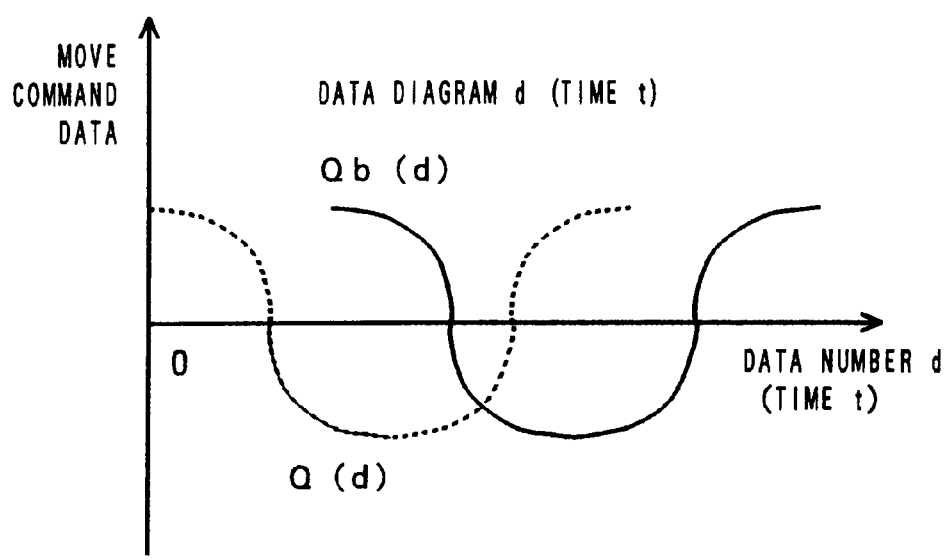

More specifically, in shifting the reference cam diagram $F(t)$ in the positive direction of the pitch circle, the initial value 0 of the index i is corrected into an integer version of $[-(Kb/T)]$. Since the data table contains no addresses that correspond to values $[-(Kb/T)]$ to $[-1]$, the position command output for this section is 0, whereupon a data diagram $Qb(d)$ as shown in FIG. 4B is obtained.

Instead of correcting the initial value of the index i, moreover, the time elapsed since the activation of the sensor 9 may be measured by means of a timer so that the values Qi are successively read from the top of the data table and outputted when the time equivalent to Kb is over.

In shifting the reference cam diagram F(t) in the negative direction of the pitch circle, in contrast with this, it is necessary only that the initial value 0 of the index i be corrected into an integer version of [Kb/T].

Alternatively, the data table may be previously updated so that the values Qi can be read from the updated data table and delivered to the axis control circuit 7 with every move command output cycle T.

In shifting the reference cam diagram F(t) by Kb in the positive direction of the pitch circle of the cam, as shown in FIGS. 4A and 4B, for example, the data for Qm is written in a position corresponding to an integer version of an address [m+(Kb/T)] of the data table, and the data for Q0 is written in a position corresponding to the integer version of the address [Kb/T] of the data table. Thus, the values of the move command data for the section from the address [0] to [(Kb/T)−1] of the data table are interpolated with 0. Naturally, the data for Qi are written in positions for addresses [i+(Kb/T)] of the data table.

In shifting the reference cam diagram F(t) by Kb in the negative direction of the pitch circle, on the other hand, the data for Q(Kb/T) is written in the position for the address [0] of the data table, and the data for Qm is written in a position for an address [m−(Kb/T)] of the data table. Thus, the values of the move command data for the section from the address [m−(Kb/T)] to [m] of the data table are interpolated with 0. Naturally, the data for Qi are written in positions for addresses [i−(Kb/T)] of the data table.

The same operation for the case where the initial value of the index i is corrected can be accomplished by updating the value of the index i with every move command output cycle T and outputting Qi with reference to the updated data table.

The cam diagram F(t) must be shifted in the pitch-circle direction of the cam in the case where, in an automatic stamper for stamping articles transported by means of a belt conveyor in a direction perpendicular to the transporting direction, stamping position is changed (example of modification of application). In this case, the transportation by means of the belt conveyor and the stamping operation are carried out in concert with each other. Thus, the stamping position can be shifted back in the article transportation direction by delaying the time for the start of operation of the electronic cam, as in the case shown in FIG. 4A, without changing the position of the sensor 9, for example.

Figure 5A:
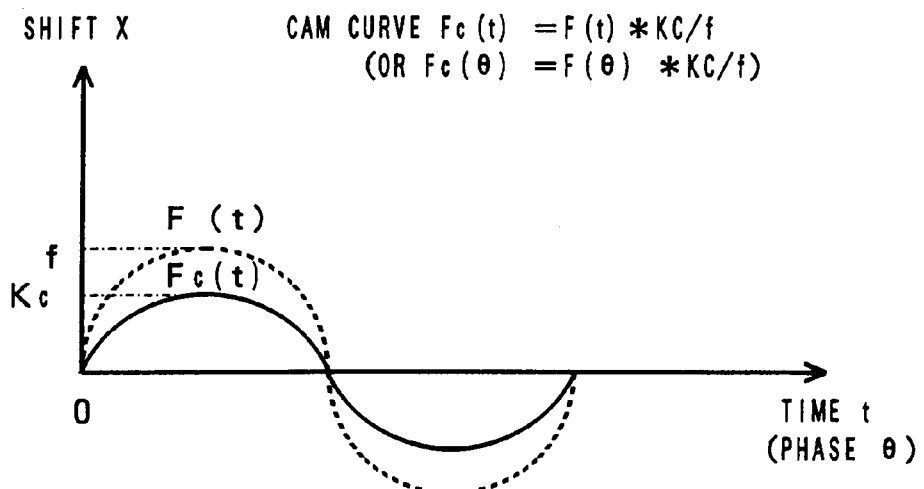
FIGS. 5A and 5B are a cam diagram and a data diagram, respectively, showing an example of operation with the lift of the reference cam changed.
Figure 5B:
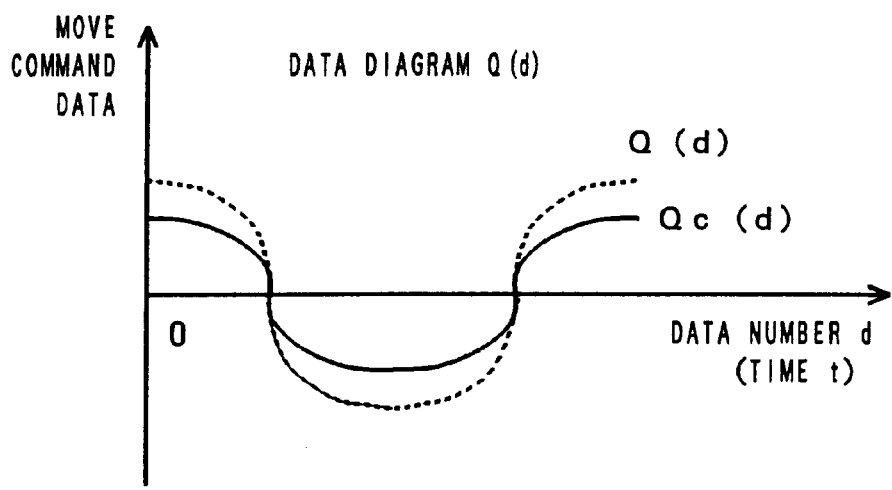

In the case where the lift of the reference cam diagram F(t) is changed to extend or compress the active region of the cam, thereby providing Fc(t), as shown in FIG. 5A, a maximum lift f of the reference cam diagram F(t) and a desired maximum lift Kc are set and stored in advance in the CMOS memory 4. When the values of the move command data Qi are read from the data table, a process Qi←Qi×(Kc/f) is executed, and the values newly obtained in this process are delivered as move commands to the axis control circuit 7. FIG. 5B shows a data diagram for these move commands.

The data table may be previously updated by multiplying each of the move command data Qi stored in the data table by (Kc/f) so that the value of the index i can be incremented as the values Qi are read from the updated data table and delivered to the axis control circuit 7 with every move command output cycle T. The lift direction can be reversed by setting Kc at a negative value.

The lift (stroke) of the cam diagram F(t) must be changed in the case where the height of bottles as objects of operation is changed in an automatic machine designed so that nozzles are moved up and down to inject a refreshing beverage into the bottles (example of modification of the operation of the electronic cam).

The following is a description of a process for extending or compressing the cam diagram F(t) in the pitch circle direction.

Theoretically, the cam diagram F(t) can be extended or compressed by only lengthening or shortening the move command output cycle T for the delivery of the move command data Qi. Actually, however, the output cycle T is a value proper to the motion controller, so that it cannot be changed with ease. Accordingly, the cam diagram F(t) must be extended or compressed in the pitch-circle direction without changing the value of the move command output cycle T.

The following is a description of a process for extending the cam diagram F(t) in the pitch-circle direction to obtain a cam diagram Fd(t) or compressing it to obtain a cam diagram Fe(t). Let it be supposed that the values of move command data initially stored in the data table are Qi (i =0 to m), the number of those data is m (actually m+1), the values of move command data to be finally outputted are Pk (k=0 to n), the number of those data is n (actually n+1), and the move command output cycle is T.

Thus, the rate of extension or compression is n/m, which is determined by assigning the value of the data number n. In other words, the number n is n=(m·A)/100, which is 2·m if the rate of elongation (A) is set at 200%.

Figure 6A:
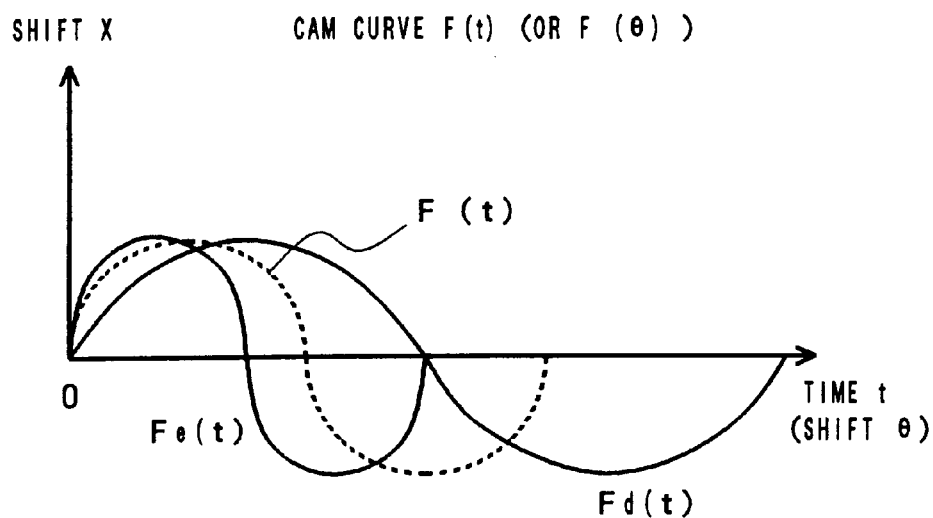
FIGS. 6A and 6B are a cam diagram and a data diagram, respectively, showing an example of operation with the reference cam extended or compressed in the pitch-circle direction.
Figure 6B:
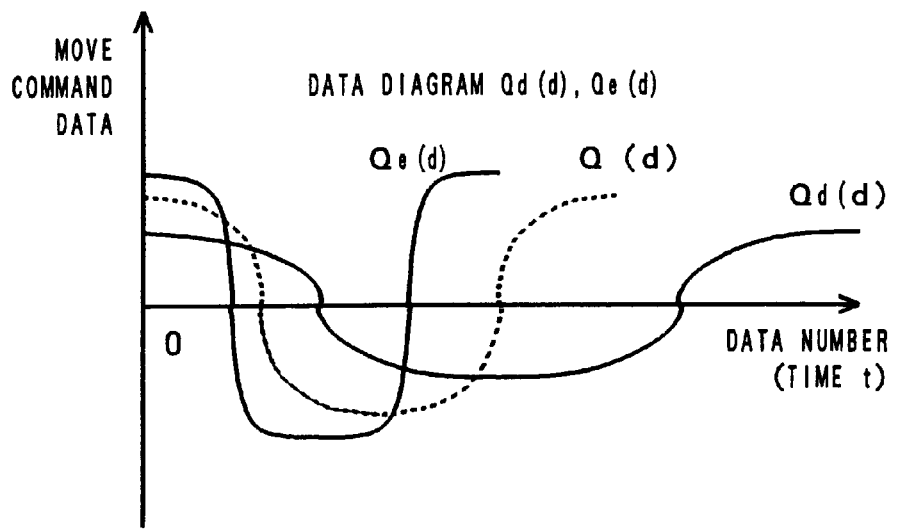

In FIG. 6B, Qd(d) and Qe(d) represent incremental move command data diagrams.

In the case of incremental such move commands, as shown in FIG. 6B, the sum total of move commands having so far been outputted is the lift for each point of time. In order to make the lift of the cam for each point of time corresponding to the reference cam diagram equal to the cam lift for each point of time of the reference cam diagram in the extension or compression process, therefore, the sum total of the move commands outputted so far must be uniform for each point of time.

More specifically, the overall area of the reference data diagram Q(d) for the data number m, the overall area of the extended data diagram Qd(d) obtained by increasing the data number to n, and the overall area of the compressed data diagram Qe(d) obtained by reducing the data number to n must be made equal.

This is achieved substantially in the following manner. First, the values of the move command data Qi for the addresses i are divided by the number n that is different from the data number m, whereupon n number of sub-data qi-1, qi-2, . . . , qi-n are obtained for the individual move command data Qi, that is, (m×n) number of sub-data are obtained in total. Then, every m number of sub-data at the end are extracted from the total (m×n) number of sub-data to form n number of bundles, and correction is made so that total values of the m number of sub-data in each bundle are successively outputted with every predetermined cycle T.

Figure 7:
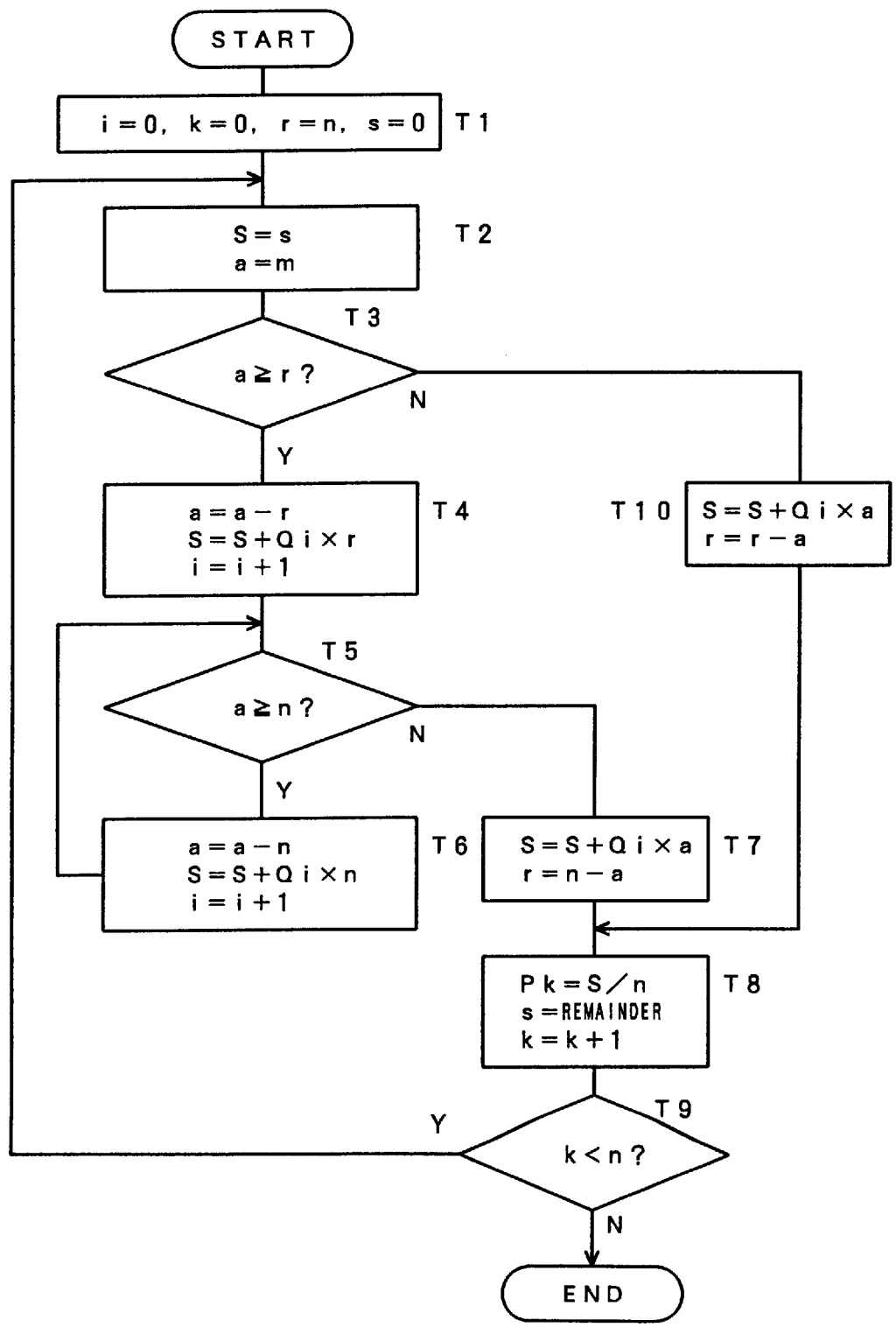
FIG. 7 is a flowchart showing an example of processing for the case where the reference cam is extended or compressed in the pitch-circle direction.

Thereupon, the processor 1 executes the processing shown in FIG. 7 in accordance with the aforesaid relations, data table stored with the move command source data Qi, move command source data number m, and output data number n that regulates the degree of extension or compression.

The processor 1 first initializes (to 0) the index i for reading the move command source data Qi, index k needed to register an output-only data table with the move command data Pk to be actually outputted, and the respective values of a read data change decision value storage register r and a residual pulse storage register s (Step T1). Then, the processor 1 substitutes the value of the residual pulse storage register s for the value of an output pulse storage register S and substitutes the number m of the move command source data for a read data change decision value storage register a (Step T2).

Thus, the initial value of the output pulse storage register S is 0, while the initial value that of the read data change decision value storage register a is equal to the number m of the move command source data.

Subsequently, the processor 1 determines whether or not the value m of the read data change decision value storage register a is not smaller than the value of the read data change decision value storage register r (Step T3). In this stage, the value of the move command source data number m is held in the register a, while the value of the output data number n for specifying the degree of extension or compression is held in the register r. In the case of extension with a <r or m<n, the result of decision is negative (N). In the case of compression with m≧n or a≧r, on the other hand, the result of decision is positive (Y).

The following is a description of the case of extension with m<n, that is, a process for the case where the result of decision in Step T3, executed for the first time after the start of the processing concerned, is negative (N).

The processor 1 first adds the product of the move command source data Qi and the value m of the register a to the current value of the output pulse storage register S, and subtracts the value m of the register a from the current value of the decision value storage register r, thereby updating the value of the register r (Step T10).

Then, the processor 1 divides the current value of the output pulse storage register S by the output data number n for specifying the degree of extension, extracts the integer part of the resulting value to obtain the move command data Pk to be actually outputted, and registers it in the output-only data table. The processor 1 also substitutes the residual integer value for the value of the residual pulse storage register s, and increments the value of the index k by one (Step T8).

Thus, in the case of extension, the actual output cycle is shorter than the theoretical output cycle. In obtaining P0 in at least a first actual output cycle, therefore, it is necessary only that P0=Q0×m/n be executed in accordance with only the first move command data Q0 involved within the cycle time. This processing is executed dividedly in Step T10 for S=S+Qi×a and in Step T8 for Pk=S/n.

In short, in S=S+Qi×a of Step T10, the initial value of S is 0, i=0, and a=m, in the first processing cycle, so that this expression is substantially equivalent to S=Q0×m. When substituting this expression for Pk=S/n of Step T8, since k=−0 is given in this stage, P0=Q0×m/n can be obtained. Thus, the movement of the cam at the corresponding point of time, that is, the aforesaid area ratio, can be maintained by means of the multiplier m/n.

In many cases, the value of S/n is a real value that contains a fractional part. Since it cannot be divided into parts smaller than the minimum output unit (hereinafter referred to as one pulse) of the move command, however, the residual integer value of S/n is stored in the residual pulse storage register s and carried over as a move command to be outputted in the next or subsequent output cycle. We have s=0 in the case where no remainder is obtained in the computation of S/n.

Then, the processor 1 determines whether or not the output data number n for defining the degree of extension is reached by the value of the index k, that is, whether or not all the required move command data Pk for extension are generated (Step T9). If the output data number n is not reached by the value of the index k, the processor 1 proceeds again to Step T2, whereupon processing for the next cycle is started to generate the next move command data Pk.

In Step T2, the processor 1 first substitutes the value of the residual pulse storage register s, that is, the value of the pulse number carried over as the move command to be outputted, as an initial value, for the value of the output pulse storage register S, and substitutes the value of the move command source data number m for the value of the read data change decision value storage register a.

Subsequently, the processor 1 determines whether or not the value m of the read data change decision value storage register a is not smaller than the value of the read data change decision value storage register r updated in the process of Step T10 in the preceding cycle (Step T3).

If m<r is given, then the theoretical output cycle described with reference to FIGS. 6A and 6B is not exceeded by the time obtained by multiplying the frequency of generation of Pk (frequency of repetition of the processing) by the actual output cycle.

Accordingly, the next move command Pk (the value of the index k has been updated in the process of Step T8 in the preceding cycle) must be generated by using the same source data as the original move command data Qi (the value of the index i has not been updated in the preceding cycle) used in the preceding cycle. Thus, the generation of the actual move commands Pk is repeated in accordance with the same move command source data until the theoretical output cycle is reached by the repetition of the actual output cycle and application of the next move command source data is needed.

If the result of decision in Step T3 is negative (N), therefore, the processor 1 repeatedly executes the processes of Steps T10, T8 and T9 in the same manner as aforesaid. More specifically, the processor 1 subtracts the value a=m for each actual output cycle from the value of the decision value storage register r, thereby updating the value of the register r and obtaining the value r equivalent to a theoretical residual output cycle time (r=r−a in Step T10). Further, the processor 1 generates the next move command Pk in accordance with the same move command data Qi as that for the preceding cycle and registers it in the output-only data file (S=S+Qi×r in Step T10 and Pk=S/n in Step T8). If a remainder is produced again in the divisional expression for S/n, the processor 1 substitutes it for the value of the residual pulse storage register s (s=remainder in Step T8) and updates the value of the index k (k=k+1 in Step T8).

Naturally, in the process of Step T10 in the second or subsequent cycle, the value of the residual pulses s carried over from the preceding cycle is added as a move command pulse number to be outputted in or after the present processing cycle according to the operation expression S=S+Qi×r.

Thereafter, the processes of Steps T2, T3, T10, T8 and T9 are repeatedly executed until the result of decision becomes positive (Y).

While this processing is repeated, when the time obtained by multiplying the frequency of generation of Pk (frequency of repetition of the processing) by the actual output cycle approaches the theoretical output cycle, and the value r that is equivalent to the residual time of the theoretical output cycle becomes smaller than the value m that is equivalent to the actual output cycle, m≧r is established so that the result of decision in Step T3 becomes positive (Y).

This result of decision indicates that next move command data Qi must be read from the source data table to generate the next move command Pk.

If the result of decision in Step T is positive (Y), therefore, the processor 1 first multiplies the value of the move command source data Qi (the value of the index i has not been updated in the preceding cycle) having so far been used for the generation of the move commands Pk, by the current value of the decision value storage register r. Further, the processor 1 adds to the above product the current value of the output pulse storage register S, that is, the pulse number value s carried over as the move command to be outputted, thereby updating the value of the register S (S=S+Qi×r in Step T4).

Actually, when the result of decision in Step T3 becomes positive (Y), a process based on the next move command source data is compulsorily started without consuming the time equivalent to the current value of the decision value storage register r updated in Step T10 of the preceding cycle, that is, the time within each actual output cycle. In this stage, therefore, the processor 1 first obtains the pulse number corresponding to a shortage of the undelivered movement according to an operation expression Qi×r, on the basis of the move command source data Qi (the value of the index i has not been updated in the preceding cycle) having so far been used, and carries it over as the move command to be outputted in or after the present processing cycle. Practically, the pulse number value s carried over from the preceding cycle separately exists as the move command to be outputted. Finally, therefore, the sum total of the pulses to be carried over as the move command pulses to be outputted in and after the present processing cycle is S=S+Qi×r, as described in Step T4. It is to be understood that the value of S on the right side of S=S+Qi×r is equal to the value of the residual pulse number s computed in the preceding cycle.

In this stage, moreover, the processor 1 increments the value of the index i by one (i=i+1 in Step T4) as preprocessing for reading the next move command source data Qi from the data table in the present processing cycle.

Each move command outputted in or after the present processing cycle contains the aforesaid carried-over movement. Therefore, the movement to be outputted corresponding to the move command source data to be read next must be reduced in the present theoretical processing cycle by a margin for the residual time r or the time overlapped between the preceding and present theoretical processing cycles.

Thus, in contrast with the aforesaid case of Step T10, the value by which the move command source data to be read next is to be multiplied, that is, the length of the time axis needed in obtaining the area for the movement corresponding to the move command source data, is not the value m that is equivalent to each actual output cycle, but the value m−r, smaller than m. Thereupon, the processor 1 subtracts the value r from the current value m of the decision value storage register a, thereby changing the value of the decision value storage register a, as a multiplier, into m−r (a=a−r in Step T4).

Subsequently, the processor 1 compares the current value of the decision value storage register a with the reference value n (Step T5). In the case of extension, m<n and 0≦r<m are given, so that a maximum value for a=a−r in Step T4 is a=m−0=m, which never exceeds n.

Naturally, therefore, the result of decision in Step T5 is negative (N). Thereupon, the processor 1 multiplies the value of the next move command source data Qi read from the source data table in accordance with the value of the index i updated in the process of Step T4 by the value of the change decision value storage register a updated in the process of Step T4, thereby obtaining the movement Qi×a corresponding to the move command from which the aforesaid overlapped time r is subtracted. Further, the processor 1 adds to the resulting value the carried-over movement S computed in Step T4, thereby updating the value of the output pulse storage register S (S=S+Qi×a in Step T7).

Moreover, the value of the decision value storage register a, the overlapped time obtained in Step T4, is subtracted from the reference value n as preprocessing for discriminating in the process (mentioned later) of Step T3 the frequency of computation of the actual move commands Pk according to the move command source data Qi newly applied in accordance with the value of the index i updated in the process of Step T4. Further, the residual time is obtained by subtracting the corresponding time of the substantial processing cycle concerned from the theoretical processing cycle, and is updated and stored in the change decision value storage register r for storing the residual time of the theoretical processing cycle concerned (r=n−a in Step T7).

Then, the processor 1 divides the current value of the output pulse storage register S by the reference value n for specifying the degree of extension, extracts the integer part of the resulting value to obtain the move command data Pk to be actually outputted, and registers it in the output-only data table. The processor 1 also substitutes the residual integer value for the value of the residual pulse storage register s, and increments the value of the index k by one (Step T8).

Naturally, the generated move command data Pk include move commands obtained by dividing the movement carried over from the preceding cycle.

Further, the processor 1 determines whether or not the output data number n for specifying the degree of extension is reached by the value of the index k, that is, whether or not all the necessary move command data Pk for extension are generated (Step T9). If the output data number n is not reached by the value of the index k, the processor 1 proceeds again to the process of Step T2. Thereupon it substitutes the value of the residual pulse storage register s for the value of the output pulse storage register S, sets the reference value m in the read data change decision value storage register a, and starts processing for the next cycle.

Based on the result of comparison between the respective values of the decision value storage registers a and r in Step T3, thereafter, the processor 1 repeatedly executes the processes of Steps T10, T8 and T9 in the case where a<r is given so that the frequency of repetition of the theoretical output cycle is not exceeded by that of the actual output cycle, that is, where the move commands Pk to be actually outputted must be generated by using the same source data Qi as in the preceding cycle. In the case where a≧r is given so that the frequency of repetition of the theoretical output cycle is exceeded by that of the actual output cycle, that is, where the move commands Pk to be actually outputted must be generated by reading the next source data Qi, on the other hand, the processor 1 repeatedly executes the processes of Steps T4, T5, T7, T8 and T9 in the same manner as aforesaid.

When the result of decision in Step T9 finally becomes negative (N), the generation of all the necessary move command data Pk for extension is completed.

FIG. 8 shows the results of computation obtained when the data diagram Qd(d) including, for example, ten (m=10) source data Q0=5, Q1=3, Q2=0, Q3=−3, Q4=−5, Q5=−5, Q6=−3, Q7=0, Q8=3 and Q9=5 is extended to a version with the data number n=12 in accordance with the processing of FIG. 7.

The results of computation of Pk include P0=4, P1=3, P2=1, P3=−1, P4=−3, P5=−4, P6=−5, P7=−2, P8=−1, P9=1, p10=3 and P11=4. More specifically, the data diagram Qd(d), which is composed of the ten source data, first moves by Q0+Q1+Q2=8, then by Q3+Q4+Q5+Q6=−16, and finally by Q7+Q8+Q9=8. On the other hand, the movement for the extension to the version with the 12 data (n=12) consists of P0+P1+P2=8, P3+P4+P5+P6+P7+P8=−16, and P9+P10+P11=8. Thus, positive and negative distances covered by the movement are equal.

The following is a description of the case of compression for $m \geq n$, that is, a process for the case of compression where the result of decision in Step T3 executed first is $a \geq r$.

In the case of compression, the actual output cycle is longer than the theoretical output cycle. Therefore, if the movement for each theoretical output cycle is only outputted during each actual output cycle, the actually outputted movement is insufficient. Thus, it is necessary previously to obtain the values of movement to be outputted corresponding to the move command source data for the first actual output cycle, in accordance with a plurality of move command source data.

Accordingly, the processor 1 first obtains the movement to be outputted during the first actual processing cycle corresponding to the first move command source data, according to the expression $S=S+Qi \times r$ in Step T4 based on the value of the index i with its initial value at 0, and updates the value of the output pulse storage register S. In the initial stage, the value of S on the right side of the expression $S=S+Qi \times r$ is 0 and i=0 and r=n (value equivalent to the theoretical processing cycle) are given. After all, therefore, $S=Q0 \times n$ is established so that only the value of the part corresponding to the source data Q0 out of the movement values to be outputted during the first actual output cycle ($S=S+Qi \times r$ in Step T4).

In this stage, moreover, the processor 1 increments the value of the index i by one as preprocessing for reading the next move command source data Qi from the data table in the present processing cycle (i=i+1 in Step T4).

Further, it is necessary to determine the movement values for the number of move command source data in the processing cycle concerned to be added up and outputted during each actual processing cycle. Accordingly, the processor 1 subtracts the current value n (value equivalent to the theoretical output cycle) of the decision value storage register r from the current value m (value equivalent to the actual output cycle) of the decision value storage register a, as a criterion for the decision, thereby obtaining the value a equivalent to the residual time of the actual output cycle, and updates and stores the resulting value in the decision value storage register a (a=a−r in Step T4).

Essentially, the value m equivalent to the actual output cycle is given by $(1/n) \times m \cdot n$, and the value n equivalent to the theoretical output cycle by $(1/m) \times m \cdot n=n$. Naturally, the actual output cycle $(1/n) \times m \cdot n=m$ is longer than the theoretical output cycle $(1/m) \times m \cdot n=n$.

Subsequently, the processor 1 compares the current value of the decision value storage register a with the reference value n (Step T5).

If the value of the decision value storage register a for storing the residual time of the actual output cycle is larger than the value n equivalent to the theoretical output cycle, then there is the next move command source data to be added and collectively outputted during the actual output cycle. Based on the value of the index i updated in the process of Step T4, therefore, the processor 1 reads the next move command source data Qi and executes an operation expression $Qi \times n$, thereby obtaining a movement value corresponding to the next move command source data Qi, and adds this value to the current value of the output pulse storage register S ($S=S+Qi \times n$ in Step T6).

If necessary in the present processing cycle, moreover, the value of the index i is incremented by one in this stage as preprocessing for further reading the next move command source data Qi from the data table (i=i+1 in Step T6).

In the discrimination process of Step T5 that can be repeatedly executed in this processing cycle, it is necessary to determine whether or not to further add the movement of the next move command source data. Accordingly, the processor 1 subtracts the reference value n (value equivalent to the theoretical output cycle) from the current value of the decision value storage register a, as a criterion for the decision, thereby obtaining the value a equivalent to the residual time of the actual output cycle, and updates and stores the resulting value in the decision value storage register a (a=a−n in Step T4).

Thereafter, the processor 1 repeatedly executes the processes of Steps T5 and T6 in the aforesaid manner until the value of the decision value storage register a for storing the value equivalent to the residual time of the actual output cycle becomes smaller than the value n equivalent to the theoretical output cycle. Based on the updated value of the index i, the processor 1 reads the next move command source data Qi, computes the values of movement corresponding to the commands according to the expression $Qi \times n$, and adds the computed values to the value of the output pulse storage register S as the values of movement to be outputted during this actual output cycle.

When the result of decision in Step T5 becomes negative (N) so that the value of the residual time a of the actual output cycle is smaller than the value n equivalent to the theoretical output cycle, therefore, all the movement values corresponding to the move command source data entirely involved in the time of each actual output cycle, at the least, are added to the value of the output pulse storage register S.

Actually, however, the repeated processes of Steps T5 and T6 or the process of Step T4 (to be executed in the case where a<n is obtained from the first discrimination process in Step T5) is compulsorily finished with the residual time a left. Therefore, the movement values corresponding to the move command source data partially involved in the time of each actual output cycle are not added to the value of the output pulse storage register S.

In order to replenish the shortage of the movement corresponding to the move command source data partially involved in the time of each actual output cycle, therefore, the processor 1 reads the next move command source data Qi partially involved in the time of each actual output cycle, in accordance with the value of the index i updated in Step T6 (in the case where the process of Step T6 is executed) or Step T4 (in the case where the process of Step T6 is not executed). Then, the processor 1 multiplies the resulting value by the residual time a, thereby obtaining the movement value equivalent to the move command source data Qi partially involved in the time of each actual output cycle, and adds the movement value to the value of the output pulse storage register S to obtain the sum total S of the movement values to be outputted within each actual output cycle ($S=S+Qi \times a$ in Step T7).

The movement values $Qi \times a$ for a part of the next move command source data Qi are previously added to the value of the output pulse storage register S by the process of $S=S+Qi \times a$ in Step T7. In order to prevent the movement value corresponding to the residual time a from being repeatedly added in the next actual output cycle, therefore, the processor 1 changes the theoretical output cycle corresponding to the move command source data Qi, from the value n equivalent to the theoretical output cycle, to n−a, and stores it in the change decision value storage register r for storing the residual time of the theoretical output cycle corresponding to the move command source data Qi (r=n−a in Step T7).

As in the aforesaid case of extension, the processor 1 divides the current value of the output pulse storage register S by the output data number n for specifying the degree of compression, extracts the integer part of the resulting value to obtain the move command data Pk to be actually outputted, substitutes the residual integer value for the value of the residual pulse storage register s to carry it over to the next processing cycle, and increments the value of the index k by one (Step T8).

Then, processor 1 determines whether or not the output data number n is reached by the value of the index k, that is, whether or not all the necessary move command data Pk for compression are generated (Step T9). If the output data number of n is not reached by the value of the index k, the processor 1 proceeds again to Step T2 in order to generate the next move command data Pk, and starts processing for the next cycle.

In Step T2, the processor 1 first substitutes the value of the residual pulse storage register s as an initial value, that is, the value of the pulse number carried over as the move command to be outputted, for the value of the output pulse storage register S as an initial value, and substitutes the number m of the move command source data, that is, the value m equivalent to the actual output cycle, for the value of the read data change decision value storage register a.

Subsequently, the processor 1 determines whether or not the value m of the read data change decision value storage register a is not smaller than the value of the read data change decision value storage register r updated in the process of Step T7 in the preceding cycle (Step T3).

In the case of compression, however, m≧n and r≦n are given, so that the result of decision in Step T3 can never be a=m<r. In short, in the case of compression, the theoretical output cycle can never be longer than the actual output cycle (the result of decision in Step T3 is always positive (Y)), and the sum total of the movement values to be outputted in each actual output cycle is always obtained by adding up movement values corresponding to one or more move command source data.

Thereafter, the processor 1 repeatedly executes the processes of Steps T2 to T9 in the same manner as aforesaid. Based on the result of comparison in Step T5 of the value of the decision value storage register a with the value n equivalent to the theoretical output cycle, the processor 1 adds up all of the movement values corresponding to one or more move command source data entirely involved in each actual output cycle and the movement values corresponding to the move command source data partially involved in each output cycle. Then, the processor 1 divides the resulting value by the data number n for compression, thereby successively obtaining the incremental move commands Pk to be outputted during each actual output cycle, and registers it in the output-only data table.

When the result of decision in Step T9 finally becomes negative (N), the generation of all the necessary move command data Pk for compression is completed.

FIG. 9 shows the results of computation obtained when the data diagram Qd(d) including, for example, ten (m=10) source data Q0=5, Q1=3, Q2=0, Q3=−3, Q4=−5, Q5=−5, Q6=−3, Q7=0, Q8=3 and Q9=5 is compressed to a version with the data number n=8 in accordance with the processing of FIG. 7.

The results of computation of Pk include P0=5, P1=3, P2=−2, P3=−6, P4=−5, P5=−3, P6=2 and P7=6. As mentioned before, the data diagram Qd(d), which is composed of the ten source data, first moves by Q0+Q1+Q2=8, then by Q3+Q4+Q5+Q6=−16, and finally by Q7+Q8+Q9=8. On the other hand, the movement for the compression to the version with the 8 data (n=8) consists of P0+P1=8, P2+P3+P4+P5=−16, and P6+P7=8. Thus, positive and negative distances covered by the movement are equal.

Explained individually so far are the processing for the case where the reference cam diagram F(t) is shifted in the lift direction (see FIG. 3), processing for the case where the diagram F(t) is shifted in the pitch-circle direction (see FIG. 4), processing for the case where the lift is changed to extend or compress the active region of the cam (see FIG. 5), and processing for the case where the diagram F(t) is extended or compressed in the pitch-circle direction (see FIG. 6), but it is possible to combine any two or more processings selected from these processings so that the cam diagram F(t) is freely shifted, extended, or compressed in the lift direction or pitch-circle direction.

According to the embodiment described above, the shift position of the cam and the incremental move command data Q(d) are obtained as functions (move command values for each move command distribution cycle). Alternatively, however, the shift position and movement of the cam may be obtained through the medium of the rotational angle θ of the cam. In this case, the rotational angle θ of the cam may be obtained for the movement of the conveyor or the like that cooperates with the cam so that the shift position x corresponding to the rotational angle θ is stored. More specifically, it is necessary only that the axes of abscissa and ordinate of the cam curve F(θ) of FIG. 2A represent the rotational angle (phase) θ of the cam and the shift position, respectively. Referring now to the flowchart of FIG. 10, there will be described an embodiment in which the shift position x corresponding to the rotational angle θ of the cam is stored in advance as a data table in the CMOS memory 4, a rotation amount Δθ of the cam is obtained corresponding to the movement of the conveyor that cooperates with the cam, and a move command Δx for the camshaft is obtained and outputted.

A motor (servomotor or pulse motor) for driving the conveyor or other cooperator that cooperates with the cam may also be controlled by means of the processor 1 of the motion controller shown in FIG. 1. First, a function g(y) for obtaining the rotation amount Δθ of the cam from a movement y of the motor for driving the conveyor or the like is set. If the motor for driving the conveyor is moved for L to cause the cam to make a revolution, for example, the rotation amount Δθ of the camshaft for the movement y of the motor can be obtained as Δθ=g(y)=y×360°/L. This function g(y) is set in advance.

Figure 10:
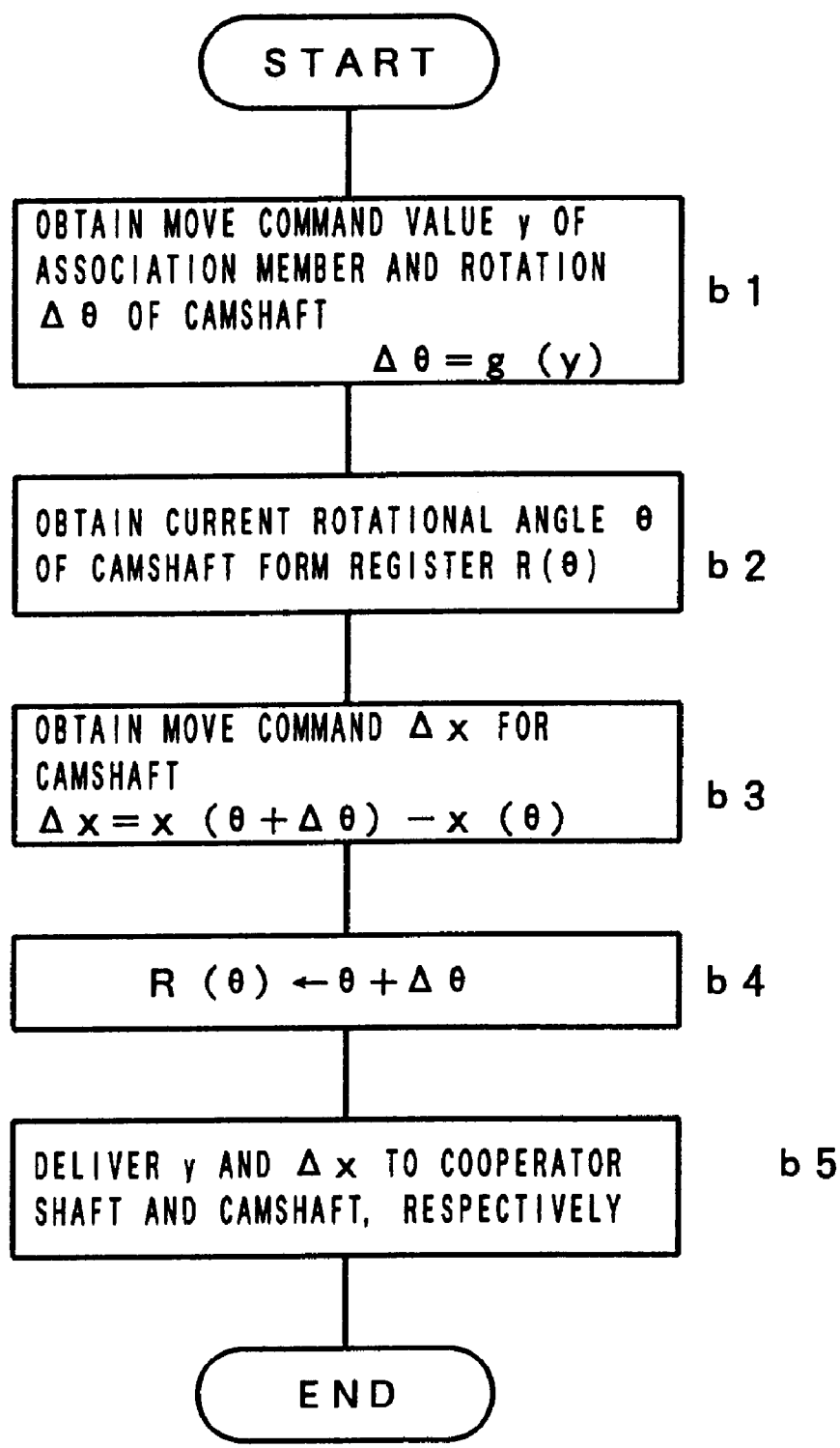
FIG. 10 is a processing flowchart according to an embodiment in which electronic cam operation is performed in conformity to the speed of a cooperator such as a conveyor that cooperates with the cam, through the medium of the rotational angle of the cam used.

When the camshaft is rotated in response to a signal from the sensor 9, the processor 1 starts the processing shown in FIG. 10 with every move command distribution cycle T.

First, the move command value y to the motor for driving the conveyor or the like in the move command distribution cycle concerned is obtained, and the rotation amount Δθ of the cam is obtained according to the function g(y) that is set based on the move command value y. If the cam is caused to make a revolution with the movement L of the motor for driving the conveyor or the like, as in the aforesaid case, the rotation amount Δθ can be obtained as Δθ=y×360°/L, since g(y)=y×360°/L is given (Step b1).

Then, the current rotational angle θ is read from a register R(θ) for storing the rotational angle θ of the cam (Step b2).

The register R(θ) is initially set to "0" at the start of the camshaft rotation, so that θ=0 is read at the beginning.

Then, shift positions x(θ) and x(θ+Δθ) of the camshaft corresponding to rotational angles θ and (θ+Δθ) are read from the data table, and the move command Δx for the camshaft for the present cycle is obtained from the difference between the two positions (Step b3). More specifically, the following computation is carried out to obtain the move command Δx.

$$\Delta x = x(\theta + \Delta\theta) - x(\theta).$$

Subsequently, the rotation amount Δθ obtained in Step b1 is added to the rotational angle θ stored in the register R(θ), and the resulting sum is stored in the register R(θ) (Step b4). Then, the move command values y and Δx obtained in Steps S1 and b3 are delivered to the motors for driving the conveyor or the like and the camshaft (Step b5), whereupon the processing for the present cycle is finished. As the processes of Steps b1 to b5 are executed with every move command distribution cycle, thereafter, cam operation is executed in conformity to the speed of the conveyor or some other associated members.

In shifting the cam diagram by Ka from the stroke center position O of the cam, as shown in FIG. 3, moreover, it is necessary only that the shift value Ka be added to the move command value Δx obtained in Step b3 when the rotational angle θ read in Step b2 is "0" or at the start of the cam rotation.

In shifting the rotation start timing of the cam by Kb, as shown in FIG. 4, it is necessary only that the rotation start timing of the camshaft be simply shifted by Kb. In changing the cam stroke by a factor Kc/f, as shown in FIG. 5, furthermore, the value obtained by multiplying the move command value Δx obtained in Step b3 by Kc/f must only be outputted.

In the case where the speed of the conveyor or the like is changed, according to the present embodiment, it is necessary only that the processes of Steps b1 to b5 be carried out. This is because the shift position of the cam is obtained in conformity to the movement y of the conveyor or some other associated members, according to the present embodiment, so that, though the conveyor speed is changed, the shift position of the cam can be adjusted to the conveyor speed. Thus, the rotational speed of the cam obtained is conformable to the speed of the conveyor or the like.

What is claimed is:

1. A motion controller comprising:
    storage means for storing a numeric array of move command data corresponding to a reference cam diagram based on a time-series; and
    automatic correcting means for correcting the move command data stored in the storage means to generate new move command data corresponding to a cam diagram different from said reference cam diagram, said automatic correcting means comprising a processor correcting the move command data for every processing cycle of the processor, wherein the motion controller outputs the move command data based upon the cam diagram different from said reference cam diagram.

2. A motion controller comprising:
    storage means for storing a shift position comprising a reference cam diagram in accordance with the rotational angle of a cam;
    rotational angle computing means for obtaining the value of the rotational angle of the cam in accordance with the movement of a member adapted to cooperate with the cam; and
    move command data computing means for obtaining, for every move command output cycle, the rotational angle of the cam from the rotational angle value of the cam obtained by the rotational angle computing means and obtaining a shift movement stored in the storage means from the rotational angle, and using the shift movement as move command data.

3. A motion controller according to claim 2, which further comprises automatic correcting means for correcting said shift movement to generate new move command data.

4. A motion controller comprising:
    storage means for storing a numeric array of move command data corresponding to a reference cam diagram based on a time-series; and
    automatic correcting means for correcting the move command data stored in the storage means to generate new move command data corresponding to a cam diagram different from said reference cam diagram, said automatic correcting means comprising a processor correcting the move command data for every processing cycle of the processor, wherein said automatic correcting means one of extends and compresses a time axis of the reference move command data and extracts move command data corresponding to an actual move command output cycle from the numeric array of the move command data with the time axis extended or compressed to regenerate the numeric array of move command data.

5. A motion controller according to claim 1, wherein said automatic correcting means carries out automatic correction by adding a constant to a numeric value of the reference move command data at the start of cam operation.

6. A motion controller comprising:
    storage means for storing a numeric array of move command data corresponding to a reference cam diagram based on a time-series; and
    automatic correcting means for correcting the move command data stored in the storage means to generate new move command data corresponding to a cam diagram different from said reference cam diagram, said automatic correcting means comprising a processor correcting the move command data for every processing cycle of the processor, wherein said automatic correcting means carries out automatic correction by shifting each of numeric values of the reference move command data along the time axis.

7. A motion controller according to claim 1, wherein said automatic correcting means carries out automatic correction by multiplying each of numeric values of the reference move command data by a constant.

8. A motion controller comprising:
    storage means for storing a numeric array of move command data corresponding to a reference cam diagram based on a time-series; and
    automatic correcting means for correcting the move command data stored in the storage means to generate new move command data corresponding to a cam diagram different from said reference cam diagram, said automatic correcting means comprising a processor correcting the move command data for every processing cycle of the processor, wherein said automatic correcting means carries out automatic correction by combining a plurality of:

(1) extending or compressing the time axis of the reference move command data and extracting move command data corresponding to an actual move command output cycle from the numeric array of the move command data with the time axis extended or compressed to regenerate the numeric array of move command data;

(2) adding a constant to a numeric value of the reference move command data at the start of cam operation;

(3) shifting each of numeric values of the reference move command data along the time axis; and (4) multiplying each of numeric values of the reference move command data by a constant.

9. A motion controller according to claim 3, wherein said automatic correcting means carries out automatic correction by combining a plurality of:

(1) extending or compressing the time axis of the reference move command data and extracting move command data corresponding to an actual move command output cycle from the numeric array of the move command data with the time axis extended or compressed to regenerate the numeric array of move command data;

(2) adding a constant to a numeric value of the reference move command data at the start of cam operation;

(3) shifting each of numeric values of the reference move command data along the time axis; and (4) multiplying each of numeric values of the reference move command data by a constant.

* * * * *

UNITED STATES PATENT AND TRADEMARK OFFICE
CERTIFICATE OF CORRECTION

PATENT NO.: 6,133,705
DATED : October 17, 2000
INVENTOR(S): Hideaki INOUE, et al.

It is certified that errors appear in the above-identified patent and that said Letters Patent is hereby corrected as shown below:

ON THE TITLE PAGE

Item [73] change "Yamanishi" to --Yamanashi--.*

Item [75] after "Yamada", delete "-gun".

Column 4,
 line 20, change "f(t)" to --F(t)--.

Column 7,
 line 52, change "k= -0" to --K=0--.

Signed and Sealed this

Eighth Day of May, 2001

Attest:

NICHOLAS P. GODICI

*Attesting Officer*    Acting Director of the United States Patent and Trademark Office